United States Patent [19]

Henry et al.

[11] Patent Number: 5,648,438

[45] Date of Patent: Jul. 15, 1997

[54] PROCESS FOR PRODUCING POLYMERS WITH MULTIMODAL MOLECULAR WEIGHT DISTRIBUTIONS

[75] Inventors: David T. Henry, Baton Rouge; Doulgas J. McLain, Walker, both of La.; Joseph D. Domine; Aspy Keki Mehta, both of Humble, Tex.; William Joseph Zafian, Pasadena, Tex.; Norbert Baron, Cologne, Germany; Bernard J. Folie, Rhode-St. Genese, Belgium

[73] Assignee: Exxon Chemical Patents, Inc., Wilmington, Del.

[21] Appl. No.: 221,915

[22] Filed: Apr. 1, 1994

[51] Int. Cl.⁶ .................................................... C08F 2/14
[52] U.S. Cl. .................................................... 526/65; 526/86
[58] Field of Search ................................ 526/65, 86, 64

[56] References Cited

U.S. PATENT DOCUMENTS

| | | | |
|---|---|---|---|
| 3,536,693 | 10/1970 | Schrader et al. | 260/94.9 |
| 3,575,950 | 4/1971 | Gleason et al. | 260/94.9 |
| 3,756,996 | 9/1973 | Pugh et al. | 260/87.3 |
| 3,917,577 | 11/1975 | Trieschmann et al. | 26/94.9 R |
| 4,085,266 | 4/1978 | Nakai et al. | 526/65 |
| 4,665,208 | 5/1987 | Welborn et al. | 526/124 |
| 4,937,299 | 6/1990 | Ewen et al. | 526/119 |
| 4,939,217 | 7/1990 | Stricklen | 526/114 |
| 5,055,438 | 10/1991 | Canich | 526/141 |
| 5,064,802 | 11/1991 | Stevens et al. | 526/134 |
| 5,096,867 | 3/1992 | Canich | 526/160 |
| 5,169,913 | 12/1992 | Staffin et al. | 526/65 |

FOREIGN PATENT DOCUMENTS

| | | |
|---|---|---|
| 096221A2 | 12/1983 | European Pat. Off. . |
| 0128045B1 | 12/1984 | European Pat. Off. . |
| 0128046B1 | 12/1984 | European Pat. Off. . |
| 0129368B1 | 12/1984 | European Pat. Off. . |
| 0260999A1 | 3/1988 | European Pat. Off. . |
| 0260130A1 | 3/1988 | European Pat. Off. . |
| 0277004A1 | 8/1988 | European Pat. Off. . |
| 0277003A1 | 8/1988 | European Pat. Off. . |
| 0420436A1 | 4/1991 | European Pat. Off. . |
| 0533452A1 | 3/1993 | European Pat. Off. . |
| 278476A3 | 5/1990 | Germany . |
| 1208120 | 10/1970 | United Kingdom . |
| 1251103 | 10/1971 | United Kingdom . |
| 1314084 | 4/1973 | United Kingdom . |
| 1332859 | 10/1973 | United Kingdom . |
| WO90/03414 | 4/1990 | WIPO . |
| WO91/04257 | 4/1991 | WIPO . |
| WO92/00333 | 1/1992 | WIPO . |
| WO92/02803 | 2/1992 | WIPO . |
| WO92/14766 | 9/1992 | WIPO . |
| WO92/15619 | 9/1992 | WIPO . |
| WO93/03093 | 2/1993 | WIPO . |
| WO93/08199 | 4/1993 | WIPO . |
| WO93/08221 | 4/1993 | WIPO . |
| WO93/13143 | 7/1993 | WIPO . |

OTHER PUBLICATIONS

Vickroy, et al., "The Separation of SEC Curves of HDPE into Flory Distributions", *Journal of Applied Polymer Science*, vol. 50, 551–554 (1993).

*Primary Examiner*—Thomas R. Weber

[57] ABSTRACT

The invention provides a continuous process for catalytically polymerizing a monomer feed of ethylene and at least one comonomer which comprises introducing a catalyst including a bulky ancillary ligand transition metal compound and monomer feed in an upstream reaction zone for polymerization, introducing further catalyst in a downstream reaction zone for further polymerization, the peak temperature in the downstream reaction zone being at least 50° C. higher than in the upstream zone and being above 150° C. The process economically produces polymer of good properties which is melt processable.

24 Claims, No Drawings

5,648,438

PROCESS FOR PRODUCING POLYMERS WITH MULTIMODAL MOLECULAR WEIGHT DISTRIBUTIONS

FIELD OF THE INVENTION

This invention relates to olefin polymerization processes and to polymers made by such processes. The invention relates especially to processes and low density (d<0.940) ethylene based polymers suitable for melt processing e.g. extrusion.

BACKGROUND OF THE INVENTION

It is known to polymerize olefins (a) using free radical initiators, (b) Ziegler-Natta catalysts based on titanium and vanadium transition metal compounds and (c) using metallocene based catalysts. These main types are associated with a certain type of polymer composition. Free radical polymerization gives fairy broad molecular weight distribution and extensive long chain branching. Titanium catalyst gives relatively narrow molecular weight distribution products containing significant levels of low molecular weight polymer having a high comonomer content. Finally metallocene catalysts generally give very narrow molecular weight and compositional distributions. Examples of the metallocene type are provided in EP 260999; WO EP 92/02803 and WO 92/14766. Page 19 of WO 92/14766 shows that in autoclaves generally a rise in the operating temperature takes place from the top of the reactor to the bottom as a result of the heat of polymerization. In cooled reactor systems such as tubular reactors that rise can be reduced.

It has been thought desirable to extend the range of polymer compositions producable by these metallocene and Ziegler-Natta catalyst systems and to provide a greater choice of molecular weight and compositional distribution.

Such attempts include blending different polymer compositions. EP 389611 (=WO 90/03414) uses narrow molecular weight distribution portions polymerized with metallocene catalysts and blends them to achieve desired molecular weight and compositional distributions. It is also known to arrange reactors in series and establish different polymerization conditions by varying temperature, monomer concentration and termination agent (such as hydrogen). It is also known to introduce initiators into an autoclave or tube at different positions or to use different catalyst compositions or concentrations (U.S. Pat. No. 3,536,693; U.S. Pat. No. 3,575,950; GB 251103).

GB 1314084 describes a multi-zone polymerization with vanadium and titanium based catalysts. The catalyst concentration exceeds $0.2 \times 10^{-5}$ mol of transition metal per liter. Less than 30% of the monomer is converted in the first zone per pass to give a higher molecular weight material. Pressures are below 200 atmospheres. The monomer incorporation in the different polymer fractions would vary depending on the selection of catalysts in the first and second zone. In the examples generally the second zone uses a titanium based catalyst in addition to a vanadium catalyst. Titanium based catalyst tend to produce high molecular weight materials. A higher temperature is used in the second zone; hydrogen has to be added to limit the molecular weight. A broadened molecular weight distribution product is obtainable but at a high catalyst cost, which inclusion of a high comonomer, low molecular weight fraction and at low productivity.

DD 278476 and GB 1208120 also use Ziegler-Natta catalyst.

Finally EP 128045, EP 260130 and WO 93/13143 use simultaneously introduced different metallocene-based catalysts.

These prior art techniques for extending the range of available polymer compositions have drawbacks ranging from high capital cost (series reactors); deterioration in product quality (blending); difficulty of predictably obtaining the desired target polymer compositions and penalties in production rates of polymer.

It is amongst the aims of the invention to provide a relatively simple process for predictably broadening molecular weight distribution at low production cost and without producing a low molecular weight, high comonomer fraction.

SUMMARY OF THE INVENTION

The invention provides a continuous process for catalytically polymerizing a monomer feed composition comprising at least two olefins, preferably with one being ethylene and at least one comonomer. The process comprises introducing catalyst including bulky ancillary ligand transition metal compound and monomer feed composition in an upstream reaction zone for polymerization, introducing further catalyst in a downstream reaction zone for further polymerization, the peak temperature in the downstream reaction zone being at least 10° C. higher than in the upstream zone and separately a polymer having at least two fractions, each of which constitute at least 5 wt % of the polymer, of different weight average molecular weight ($M_w$), the $M_w$ of the higher Mw fraction is at least 50% greater than the Mw of the lower Mw fraction, said polymer having a $M_w/M_n$ overall ratio of at least 2.5. The molecular weight of the fractions and their amount can be determined by deconvoluting the information from GPC as explained in the Examples.

DETAILED DESCRIPTION

In addition to providing processes for use of olefin monomers and use of catalysts, this invention provides a continuous process, in a single reactor, for catalytically polymerizing monomer feed of at least two olefins having Ziegler-Natta polymerizable bonds. The process comprises introducing a catalyst, which includes a bulky ancillary ligand transition metal compound, and monomer feed composition into an upstream reaction zone for polymerization, introducing additional catalyst into a downstream reaction zone to increase the peak temperature in the downstream reaction zone at least 10° C. higher than in the upstream zone, and collecting polymer having at least two fractions, each of which constitute at least 5 wt % of the polymer, of different weight average molecular weight ($M_w$), with the $M_w$ of the fraction having the greater $M_w$ being at least 50% greater than the $M_w$ of the fraction having the lesser $M_w$, said polymer having overall $M_w/M_n$ ratio at least 2.5.

The term "Ziegler-Natta polymerizable bonds" is directed toward those carbon—carbon bonds which are accessible to Ziegler-Natta catalysts. This means that particularly carbon-carbon double bonds which are attached to the first or last carbon atom, acetylenic bonds located in the same position, and non-conjugated double bonds or triple bonds, and olefinic or acetylenic bonds appearing in cyclic monomers.

Generally it is preferred, for this process described, that ethylene is used as a monomer in the practice of this invention. By choice of comonomer and amount of comonomer used and incorporated, the density of the polymer product can be adjusted through the range from about 0.86 g/cm3 through about 0.96 g/cm3. Preferred upper ranges are about 0.94, 0.92 and 0.90. Preferred lower density ranges are about 0.89, 0.875 and 0.88.

The monomer feed composition, useful as described previously, may contain less than about 50% inert diluent, but is preferred to have less than 30%. The process may be run at pressures greater than about 100 bar, preferably greater than about 500 bar. These polymerizations should be accomplished with minimal addition of a chain termination agent, such as hydrogen. Preferably less than 1 wt. % of hydrogen should be added. Ideally, none will be added. At high pressures and temperatures, the presence of inert diluent is less preferred, but may still have some applicability. With high pressures and temperatures, the monomers in the feed composition function as diluent but are not inert. This makes it likely that less than 50% of the monomers will be converted to polymers; for process flow enhancement, it may be preferred that less than about 30% of monomer will be polymerized. Monomer which is not polymerized may be separated and recycled with proper equipment.

Maintaining separate temperature zones in this inventive process is beneficial. Such separation helps provide the ability to make polymer of differing molecular weights. That ability may be enhanced by providing separating means, such as baffles, between zones to maintain homogeneity within a single zone and heterogeneity among zones. Such intra-zone homogeneity and inter-zone heterogeneity may be enhanced by interposing zones into which no further (or minimal) catalyst is introduced between the zones with catalyst introduction. A further enhancement of the effects of this invention may be accomplished by introducing some catalyst upstream of the first zone to produce, preferably, less than about 5 wt % of total polymer before arrival in the "first" zone; ideally this would be less than about 2 wt. %.

While ethylene is a useful comonomer, this invention may be practiced as described here with any of at least two monomers having Ziegler-Natta polymerizable bonds which are described elsewhere. Among the preferred alpha-olefins are ethylene, propylene, butene, pentene, hexene, heptene, octene, 4-methylpentene-1, and combinations thereof. More preferred monomers include ethylene, propylene, butene, hexene, octene, 4-methylpentene-1, and their combinations.

As described, this inventive process, is useful for making polymers with wide ranging molecular weight. Polymers may be made with melt indices ranging from less than 1 to extremely high. Preferably, they will be within the range of about 0.1 to about 100. Polydispersity (dispersion index or $M_w/M_n$) may be obtained in the useful range of about one to about 20. Higher ends of the preferred range will be about 15, 12, 8, and 5. Lower ends of this preferred range will be about 2, 2.5, 3, and 3.5. They will preferably be in the range of about 2.5 through about 12.

The inventive process described here is advantageously conducted in a manner such that the reactor inlet temperature is less than 65° C. Useful polymers may be made when the temperature in the upstream zone is less than about 50° C. higher, preferably less than about 30° C. higher than the reactor inlet temperature. It is beneficial for the peak temperature in the downstream zone to be above the peak temperature of the upstream zone. Preferably this difference, which may be increased or decreased dependent upon catalyst sensitivity, will be at least about 10° C. higher than that of the upstream zone, more likely, with less sensitive catalyst, that difference may need to be at least about 50° C. higher, or even being at least about 100° C. higher.

These various aspects, and combinations, of this invention as described here provide polymers useful for many products. These polymers will be particularly useful in making products for which extrusion, particularly melt extrusion, processes are used including film blowing, injection molding, blow molding protrusion, pultrusion, extrusion, extrusion coating, and wire coating.

Such processes may be usefully applied to make films, sheets, profiles, tubing, pipe, formed articles, and coated webs including paper.

With the term "upstream reaction zone" is meant a zone dose to, but downstream of the polymerization reaction vessel inlet. The term "downstream zone" refers to a reaction zone located downstream of the upstream zone and closer towards the polymerization reaction vessel outlet.

The combination of a split catalyst feed, a catalyst including a bulky ancillary ligand transition metal compound and different operating temperature in the zones provides a process which is both highly productive and produces a polymer with desirable melt processing characteristics. It is to be understood that within the broad concept, variations may be employed such as feeding different catalysts into the zone or introducing the same or different monomer feed in the downstream zone.

The term "bulky ancillary ligand" refers to a ligand which is bonded to the transition metal so as to be substantially stable under polymerization conditions and which contains at least two atoms so as to sterically restrict access to a catalytically active metal center.

The bulky ligand may contain a multiplicity of bonded atoms, preferably carbon atoms, forming a group which may be cyclic with one or more optional hetero atoms. The bulky ligand may be a cylopentadienyl derivative which can be mono-or poly-nuclear. One or more bulky ligands may be bonded to the transition metal atom. The transition metal atom is a Group IV, V or VI transition metal of the Periodic Table of Elements. Other ligands may be bonded to the transition metal, preferably detachable by a cocatalyst such as a hydrocarbyl or halogen leaving group. The catalyst maybe derived from a compound represented formula:

wherein L is the bulky ligand; X is the leaving group, M is the transition metal and m and n are such that the total ligand valency corresponds to the transition metal valency. Preferably, the catalyst is four co-ordinate such that the compound is ionizable to a $1^+$ valency state. The bulky ligand is sufficiently "bulky" to shield the metal atom The bond between that ligand and the metal atom is normally resistant to the prevailing reaction conditions relative to the leaving group and so that the ligand is said to be "ancillary". The ligands L and X may be bridged to each other and if two ligands L and/or X are present, they may be bridged. L may be a cyclopentadienyl group. The resultant compound is referred to as a metallocene. The metallocenes may be full-sandwich compounds having two ligands L which are cyclopentadienyl group or half-sandwich compounds having one ligand.

Certain types of metallocenes possess the necessary properties for the process of this invention. For the purposes of this patent specification the term "metallocene" is herein defined to contain one or more cyclopentadienyl moieties in combination with a transition metal. The metallocene catalyst component is represented by the general formula:

wherein $C_p$ is a substituted or unsubstituted cyclopentadienyl ring; M is a transition metal of group IV, V or VI of the Periodic Table of Elements; R and R' are independently selected from halogen, hydrocarbyl groups, or hydrocarboxyl groups having 1–20 carbon atoms; m=1 to 3, n=0–3, p=0–3, and the sum of m+n+p equals the oxidation state of M. Various forms of the catalyst system of the metallocene type may be used in the polymerization process of this invention.

Exemplary of the development of these metallocene catalysts for the polymerization of ethylene is found in the disclosure of U.S. Pat. No. 4,937,299 to Ewen, et al. and EP-A-0 129 368 published Jul. 26, 1989, both of which have been fully incorporated herein by reference for US legal purposes. These publications teach the structure of the metallocene catalysts and includes alumoxane as the cocatalyst. There are a variety of methods for preparing alumoxane of which one described in U.S. Pat. No. 4,665,208. Preferably, the alumoxane is methylalumoxane, especially MAO having a degree of oligomerization of from 4 to 30 as determined by a vapor phase osmometry determination of molecular weight and reacted Al-content. Unreacted alkyl aluminum may be present generally in an amount of less than 15 mol % as determined by titration of free alkyl aluminum. Other cocatalysts may be used with metallocenes, such as trialkylaluminum compounds or ionising ionic activators or compounds such as tri(n-butyl) ammonium tetra (pentafluorphenyl) boron, which ionize the neutral metallocene compound. Such ionising compounds may contain an active proton, or some other cation associated with but not coordinated or only loosely coordinated to the remaining ion of the ionising ionic compound. Such compounds are described in EP A 0 277 003 and EP A 0 277 004 both published Aug. 3, 1988 and are both herein fully incorporated by reference for U.S. legal purposes. Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International publications WO 92/00333 published Jan. 9, 1992, U.S. Pat. Nos. 5,096,867 and 5,055,438 EP A 0 420 436 and WO 91/04257 all of which are fully incorporated herein by reference for US legal purposes. In addition, the metallocene catalysts useful in this invention can include non-cyclopentadienyl catalyst components, or ancillary ligands such as boroles or carbollides in combination with a transition metal. Additionally, the catalysts and catalyst systems may be those described in U.S. Pat. No. 5,064,802 and PCT publications WO 93/08221 and WO 93/08199 published Apr. 29, 1993, all of which are herein incorporated by reference for US legal purposes.

The same or different activators may be used at various catalyst injections points. The amounts injected can vary depending on the reactor contents so as to maintain desired activator levels resulting from previous and current activator injection.

As appropriate the catalyst and activator may be accompanied by compounds which have a scavenging function and reduce the poison levels. Such compounds include triethylaluminum, triisobutylaluminum, and hydrolysates thereof.

As comonomer a $C_3$ to $C_{20}$ alpha mono-olefin may be used preferably a mono-olefin having from 4 to 12 carbon atoms or copolymerizable oligomers having a molecular weight above 30, preferably above 250. The term olefin includes aromatics and saturated cyclic compounds such as styrene. Preferably the comonomer is propylene, butene-1, pentene-1, hexene-1, heptene-1, octene-1 or decene-1.

The monomer feed may further include a diluent which can be monomer which does not react or inert materials such as ethane, butane or hydrocarbyl materials which are liquid at room temperature and pressure; preferably the diluent is less than 30 wt %, especially less than 10 wt % of the feed stream overall.

The monomer feed may include minor amounts of termination agents, but, for adiabatic process conditions, it is generally preferred that the molecular weight should be determined by the local reaction temperature. Thus preferably little (less than 1 wt %) or no termination agent (such as hydrogen) is used for molecular weight control.

Preferably the polymerization is at a pressure of at least 100 bar preferably at least 500 bar, in the substantial absence of added hydrogen (preferably less than 1 wt %) and in the presence of less than 30 wt % of the feed composition of an inert diluent. High pressure operation in the substantial absence of hydrogen permits very high peak temperatures in the downstream reaction zone so as to maximize yield, while giving a desired low melt index product. The low temperature polymerization and the higher temperature polymerization in the successive zones can be combined to permit, at the same time, high monomer conversions and moderate melt indices.

Suitably less than 50 wt % of the monomer feed is consumed in the polymerization reaction, preferably less than 30 wt %. By running the process so that there is a low monomer consumption and using unreacted monomer to absorb the heat of the polymerization reaction, a product can be obtained which has a relatively broad molecular weight distribution combined with a relatively narrow variation in the incorporation of comonomer in the high and low molecular weight fractions. There is no fraction in which the low molecular weight fraction contains a significantly higher level of comonomer.

Preferably the zones are spaces between separating members to define zones, an example of which is baffles in a reactor, preferably an autoclave, but other reactors, including tubular reactors may be used, preferably with the baffles attached to an autoclave agitator shaft, to provide a substantially back-mixed environment within each zone. The process of the invention can then be performed in a single reactor without requiring separate reactors arranged in series. Separating the upstream zone and the downstream zone by at least one zone to which substantially no catalyst is conveyed, helps to assure the bimodality which provides the greatest rheological efficiency.

Each zone to which no catalyst is conveyed, may receive additional feed gas so as to control the temperature increase and preferably maintain it at the temperature of the preceding zone.

Further improvements in processability may to be achieved by a process in which the feed has an inlet temperature of less than 65° C., preferably less than 50° C., especially less than 35° C. before its introduction. For producing a higher melt index material, a higher inlet temperature can be practiced. Catalyst maybe added in the feed in an additional, initial zone prior to the upstream zone, either inside or outside of the polymerization reaction vessel. It may be an additional upstream zone inside the reactor or may be located along the path of the feed gas supply prior to entry into the vessel. It is possible, and may be desirable, to add different catalyst at the different points. This may be used to produce in the additional, initial zone less than 5% by weight, preferably less than 2 wt %, of the final polymer with an attendant temperature rise of less than 50° C., preferably less than 40° C. or 30° C. A low amount of relatively high molecular weight material can thus be provided in a reactor blend with only minor additional capital or product preparation costs.

This aspect of the invention may also be employed independently of the use of different temperature zones in the reactor. Thus the invention secondly provides a continuous process for catalytically polymerizing a monomer feed of ethylene and at least one comonomer which comprises introducing a catalyst including a bulky ancillary ligand transition metal compound and monomer feed in an initial upstream reaction zone for polymerization, introducing further catalyst in a reaction zone downstream of the initial zone for further polymerization in which the monomer feed for the initial zone has a temperature of less than 65° C. and catalyst is added for the first polymerization in the initial zone produce less than 5% by weight of the polymer with an attendant temperature rise of less than 80° C., preferably less than 50° C.

Polymers obtained by the process of the invention have useful melt processing characteristics and can be produced without significant additional cost.

Suitably the polymer has a melt index of from 0.1 to 100. The level of comonomer may be adjusted to give densities varying from about 0.86 to 0.95 g/cm$^3$, preferably 0.87 to 0.94 g/cm$^3$.

Most processes for converting polymer by extrusion into a shaped articles such as tubes, wire coatings, cables, profiles, and films can be performed efficiently with the polymer produced by the process of the invention.

The temperature differential between the polymerization zones may be, depending on catalyst kinetics and final product requirements, from 50° to 100° C. Backmixing between the zones can be decreased in different ways. One way of achieving this is to decrease the cross-sectional flow area leading from one zone to another; another is by increasing the separation. The operating temperature and conversion can be increased also by using monomers which raise the molecular weight at a given temperature such as polyenes so that even at higher reaction temperature, a desired target melt index can be produced.

Using single autoclave reactor lay-outs, the desired polymerization of high and low molecular weight portions can be completed within an overall residence time of from 5 to 90 seconds. The overall average residence time is determined by comparing reactor volume and throughput.

Using the aforementioned process and reactor layouts, polymer compositions can be obtained which are highly melt processable having $I_{21}/I_2$ ratios, referred to herein as MIR of above 15, preferably above 25.

Typical molecular weight distributions ($M_w/M_n$) are at least 2.5 and may range from 3 to 12, preferably from 4 to 8.

Superior product properties result from a relatively uniform composition distribution. The compositional distribution can be determined down to a minimum crystallinity level by suitable test methods. A useful method is explained in detail in PCT patent application WO 93/03093 published Feb. 18, 1993.

The high MIR compositions permit easy melt processing, extrusion etc. into profiles, tubing and wire coating without detracting from the main benefit of narrow CD materials. The process permits very high outlet temperatures for a product having a low, average MI, thereby increasing monomer conversion and improving process economics.

A summary of possible conditions in the respective zones is set out in table A. The table provides a mere example and general guidance. Precise conditions will vary depending catalyst selection, comonomer, kinetics and final product requirements.

TABLE A

| | Initial zone prior to upstream zone | Upstream main zone | Down stream zone |
|---|---|---|---|
| Inlet temperature | <50° C. | <100° C. (<75° C.) | <150° C. |
| End temperature | <100° C. | <150° C. | >150° C. <300° C. (>180° C.) |
| Δ T | 50° C. approx. (40° C.) | 50° C. approx. | 50° C. approx. |
| MI; $M_w$ | MI < 0.1 $M_w$ > 200,000 | $M_w$ > 100,000 | $M_w$ > 20,000 |
| Proportion of total polymer % | <5% (2%) | *10–90% (20–80%) | *90–10% (80–20%) |
| Overall characteristics | | | |
| MI | 0.1–100 | | |
| MWD | 3–12 (4–8) | | |
| Density | 0.866–0.94 | | |

Preferred ranges are given in parentheses.
*Ignoring any material produced in the additional upstream zone.

The invention is illustrated by the Examples

The Reactor

The polymerization in the runs were carded out in a high pressure continuous polymer production facility at the indicated pressures.

The autoclave reactor has an agitator with baffles which define a first upstream zone (referred to herein as zone 1) and four downstream zones referred to herein as zones. Each zone is slightly backmixed by the agitator, but backmixing between the zones is limited by the baffles. Separate catalyst injection points are provided at zone 1 and zone 2 and optionally the other zones. Fifty percent of the reactor feed (monomers and diluent, if used) was fed from the high pressure compressor to zone 1 of the reactor. The remainder of the reactor feed was fed to three zones (1,2 and 4) through side feeds controllable by appropriate valves. Amounts fed to zones 2 and 4 were just enough to prevent backflow from the reactor and concomitant plugging of the inlet.

At the outlet of the reactor there is located a catalyst killer injection point. The killer used in the examples was water which was added in a small amount related to the catalyst injection rate so as to deactivate the catalyst and prevent polymerization downstream and during recycling of the monomer mixture as explained later on.

Downstream of the killer injection point is a let down valve which reduces the pressure of the monomer/polymer mixture immediately prior to entry into a high pressure separator (HPS) for separating the monomer/polymer mixture. The polymer rich phase was taken from the HPS for further processing; the monomer rich phase is recycled to the reactor via the high pressure recycle system consisting of a series of coolers and a high pressure compressor which supplies the feed to the polymerization reactor

The Process

Dimethylsilyl bis(tetrahydroindenyl) zirconium dichloride was used as a transition metal catalyst component. Methyl alumoxane in toluene (30% by weight) obtained from Ethyl Corp. was used as an activator. The Al:Zr mol ratio was 1000. The catalyst components were combined in a solution of Isopar™ C and supplied by a pump arrangement to two separate catalyst injection points one in zone 1 and another in zone 2 for these non-limiting examples.

Catalyst feed rates was adjusted to maintain the indicated zone temperatures.

EXAMPLE 1

Table 1 sets out the polymerization conditions for an ethylene propylene mixture.

TABLE 1

|  | Main feed temperature | Side feed temperature | Zone 1 reactor temperature |
|---|---|---|---|
| Run 1 | (80° F.) 27° C. | (75° F.) 24° C. | (210° F.) 99° C. |
| Run 2 | (70° F.) 21° c. | (60° F.) 15.5° C. | (195° F.) 90.5° C. |
| Run 3 | (65° F.) 18° C. | (45° F.) 7.2° C. | (185° F.) 85° C. |

|  | Zone 2 reactor temperature | $C^3$ = in feed mol % |
|---|---|---|
| Run 1 | (380° F.) 190° C. | 58 |
| Run 2 | (355° F.) 179° C. | 66 |
| Run 3 | (340° F.) 171° C. | 65 |

Table 2 sets out the analytical details obtained by GPC and other analysis of the compositions produced in the runs.

TABLE 2

|  | MI | Density | MIR | MWD |
|---|---|---|---|---|
| Run 1 | 13 | 0.899 | 29 | 4.6 |
| Run 2 | 17 | 0.882 | 31 | 4.6 |
| Run 3 | 12 | 0.882 | 28 | 4.6 |

| | Weight Average Molecular Weights (and weight percentage) | | | |
|---|---|---|---|---|
|  | Overall UC | First fraction | Second fraction | Third fraction |
| Run 1 | 51900 | 121000 (20%) | 47800 (44%) | 21700 (30%) |
| Run 2 | 52300 | 121000 (22%) | 46700 (43%) | 19100 (31%) |
| Run 3 | 56700 | 139000 (19%) | 50500 (46%) | 22800 (29%) |

To probe the molecular make-up of the molecular weight distributions of product made by the process of this invention, further mathematical deconvolutions of the GPC data were performed. The procedure involves mathematically matching the GPC data of the product with a combination (at different molecular weights) of standard single-site catalyst produced components (i.e., each component having a 2.0 polydispersity index, Flory-type distribution). The results of this treatment are in Table 2 for the three inventive process produced products, where the amounts and molecular weight details of the individual components are shown. (By way of comparison, a standard metallocene produced polymer can typically be matched similarly with a single such component.) This data analysis was accomplished in a manner like that described by Vickroy, et al. in "The Separation of SEC Curves of HDPE into Flory Distribution," *Journal of Applied Polymer Science,* Vol 50, 551–554 (1993).

Gel Permeation Chromatography (GPC) is a liquid chromatographic technique used to measure the molecular weight (MW) and molecular weight distributions (MWD) of polymers.

| Equipment: | |
|---|---|
| Instruments | Water model 150C chromatograph |
| Columns | Three (3) Shodex AT-80M (mixed bed) |
| Solvent | 1,2,4,trichlorobenzene (HPLC grade) |
| Operating Conditons | Temperature 145° C. Flow rate 1 ml/min Run time 60 min Injection vol. 300 microliters |

Sample Preparation: Samples are prepared by weighing 10 mg of sample into a 20 cc vial. Ten (10) cc of trichlorobenzene (TCB) is added and the mixture stirred at about 180 C till all the sample is dissolved (about 30 min). The solutions are then transferred to auto-sampler vials and placed in the 150C GPC.

Calibration: The instrument was calibrated by using National Bureau of Standards Polyethylene 1475, fitting the results to a third order calibration curve.

Data Acquisition and Evaluation: Data are acquired and all calculations performed using Waters "Expert-Ease" software running on a VAX 6410 computer.

EXAMPLE 2

This is a predictive Example; not based on an actual test. The predictive model assumes no backmixing of monomers and/or heat. Its predictive quality was tested and found to be fairly accurate on the basis of actual tests such as those set out in Example 1.

The reactor conditions were as follows T=160° C. (320° F.), the target MI of the overall polymer composition was 4.5 and the percentage of butene-1 derived units in the polymer was 11% yielding an approximate 0.90 density.

At an inlet temperature of 35° C. (95° F.) for the inlet end of the reactor, one obtains a melt index of 0.0002 corresponding to an $M_w$ of from $1.0 \times 10^6$ to $0.60 \times 10^6$. The molecular weight is in practice lowered toward $0.6 \times 10^6$ because of the generation of hydrogen as a by-product of the polymerization and its accumulation in a continuous high pressure reactor.

The amount of the high molecular weight material produced can be kept low by injecting a suitable low level of catalyst and restricting the residence time at the low temperature.

If appropriate, these small levels of high molecular weight polymer can be generated in tubular feed stream conduits leading from the compressor to the autoclave pressure vessel.

It is believed that because the amounts of high molecular weight product are so small that materials containing them can be generated and processed without undue difficulty It is clear that this technique can be used so that this polymerization precedes a main upstream polymerization under constant, backmixed conditions leading to the absence of temperature variation in the reactor.

Alternatively it may be used in addition to a multi zone polymerization in an autoclave as described in Example 1.

We claim:

1. A continuous process, in a single reactor, for catalytically polymerizing monomer feed of at least two olefins having Ziegler-Natta polymerizable bonds which comprises introducing a catalyst which includes a metallocene and monomer feed composition into an upstream reaction zone for polymerization, introducing further catalyst which includes a metallocene into a downstream reaction zone for further polymerization, the peak temperature in the downstream reaction zone being at least 10° C. higher than in the upstream zone, and collecting polymer having at least two fractions, each of which constitute at least 5 wt % of the polymer, of different weight average molecular weight ($M_w$), with the $M_w$ of the fraction having the greater $M_w$ being at least 50% greater than the $M_w$ of the fraction having the lesser $M_w$, said polymer having an overall $M_w/M_n$ of at least 2.5 and a uniform composition distribution.

2. The process according to claim 1 in which the polymerization occurs at a pressure of at least 100 bar and in the presence of less than 30 wt % of the feed composition as inert diluent.

3. The process according to claim 2, in which the polymerization occurs at a pressure of at least 500 bar and in the presence of less than 30 wt % of the feed composition as inert diluent.

4. The process according to claim 1 in which less than 50 wt % of the feed composition is consumed in the polymerization reaction.

5. The process according to claim 3 in which less than 33 wt % of the feed composition is consumed in the polymerization reaction.

6. The process according to claim 2 in which less than 50 wt % of the feed composition is consumed in the polymerization reaction.

7. The process according to claim 6 in which less than 30 wt % of the feed composition is consumed in polymerization reaction.

8. The process according to claim 2 in which the zones are spaces between separating members in an autoclave with the baffles attached to an autoclave agitator shaft, to provide a substantially back-mixed environment within each zone and additional feed gas is supplied to such spaces.

9. The process according to claim 4 in which the zones are spaces between separating members in an autoclave with the baffles attached to an autoclave agitator shaft, to provide a substantially back-mixed environment within each zone and additional monomer feed is supplied to such spaces.

10. The process according to claim 8 in which the upstream zone and the downstream zone are separated by at least one zone to which substantially no additional catalyst is injected.

11. The process according to claim 10 in which the monomer feed has an inlet temperature of less than 65° C. and catalyst is added in the feed at an additional, initial zone prior to the upstream zone, so as to produce, in the additional zone, less than 5% by weight of the final polymer with an attendant temperature rise, in the initial zone, of less than 50° C.

12. The process according to claim 11 in which the monomer feed has an inlet temperature of less than 65° C. and catalyst is added in the feed at an additional, initial zone prior to the upstream zone, so as to produce in the additional zone, less than 2% by weight of the final polymer with an attendant temperature rise, in the initial zone, of less than 30° C.

13. A continuous process for catalytically polymerizing monomer feed of at least two olefins having Ziegler-Natta polymerizable bonds which comprises introducing catalyst including a metallocene and the monomer feed in an initial reaction zone for polymerization, introducing further catalyst including a metallocene in a reaction zone downstream of the initial polymerization for further polymerization in which the monomer feed has a temperature of less than 65° C. before its introduction and catalyst is added for polymerization in the initial zone to produce less than 5% by weight of the polymer with an attendant temperature rise of less than 50° C.

14. The process according to claim 3 in which the polymer has a melt index of from 0.1 to 100 and a MWD of from 3 to 12.

15. A process comprising melt extruding polymer obtained by a process according to claim 14.

16. A continuous process for catalytically polymerizing a monomer feed of ethylene and at least one comonomer which comprises introducing a catalyst including a metallocene and monomer feed in an upstream reaction zone for polymerization, introducing further catalyst including a metallocene in a downstream reaction zone for further polymerization, the peak temperature in the downstream reaction zone being at least 50° higher than in the upstream zone and being above 100° C.

17. A process for producing polymer comprising:
 a) introducing monomer feed composition comprising at least two different olefins into a polymerization reactor;
 b) maintaining an upstream reaction zone and downstream reaction zone within the reactor;
 c) introducing a catalyst, which includes a metallocene, into the upstream zone;
 d) introducing a catalyst, which includes a metallocene, into the downstream zone;
 e) maintaining the downstream reaction zone at a temperature at least 100° C. higher than the upstream zone; and
 f) collecting resulting polymer.

18. A process for using a catalyst, which includes a metallocene, comprising:
 a) introducing monomer feed composition comprising at least two different olefins into a polymerization reactor;
 b) maintaining an upstream reaction zone and downstream reaction zone within the reactor;
 c) introducing a catalyst, which includes a metallocene, into the upstream zone;
 d) introducing a catalyst, which includes a, metallocene into the downstream zone;
 e) maintaining the downstream reaction zone at a temperature at least 100° C. higher than the upstream zone; and
 f) collecting resulting polymer.

19. The process of claim 1 wherein one olefin is ethylene.

20. The process of claim 3 wherein one olefin is ethylene.

21. The process according to claim 1 in which no hydrogen is added to the reactor.

22. The process according to claim 1 in which less than 1 wt % hydrogen is added to the reactor.

23. The process according to claim 13, in which the attendant temperature rise is less than 30° C.

24. The process according to claim 1, wherein the catalyst in the upstream and downstream polymerization zones is the same.

* * * * *